(12) United States Patent
Kubo et al.

(10) Patent No.: US 9,469,101 B2
(45) Date of Patent: Oct. 18, 2016

(54) CONTROL APPARATUS AND CONTROL METHOD FOR CONTROLLING FORMING APPARATUS WHICH FORMS CONCAVO-CONVEX STRUCTURE

(71) Applicant: CANON KABUSHIKI KAISHA, Tokyo (JP)

(72) Inventors: Hideki Kubo, Kawasaki (JP); Hideki Kadoi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/754,976

(22) Filed: Jun. 30, 2015

(65) Prior Publication Data
US 2016/0001549 A1 Jan. 7, 2016

(30) Foreign Application Priority Data
Jul. 3, 2014 (JP) .................. 2014-137905

(51) Int. Cl.
*B41J 2/045* (2006.01)
*B29C 67/00* (2006.01)
*B41M 3/06* (2006.01)
*B41J 2/21* (2006.01)
*B33Y 10/00* (2015.01)

(52) U.S. Cl.
CPC ........ *B41J 2/04536* (2013.01); *B29C 67/0051* (2013.01); *B29C 67/0059* (2013.01); *B41M 3/06* (2013.01); *B33Y 10/00* (2014.12); *B41J 2/04586* (2013.01); *B41J 2/2117* (2013.01); *G05B 2219/49023* (2013.01)

(58) Field of Classification Search
CPC .................................. B29C 67/0088
See application file for complete search history.

(56) References Cited

U.S. PATENT DOCUMENTS 6,997,698 B2 * 2/2006 Silverbrook ............ B22F 3/008
425/375
2004/0159978 A1 * 8/2004 Nielsen ............... B29C 67/0081
264/308

(Continued)

FOREIGN PATENT DOCUMENTS

JP 2000-318140 A 11/2000
JP 2001-225459 8/2001

(Continued)

OTHER PUBLICATIONS

European search report issued in corresponding application No. 15001985.9 on Dec. 3, 2015.

*Primary Examiner* — An Do
*Assistant Examiner* — Renee I Wilson
(74) *Attorney, Agent, or Firm* — Carter, DeLuca, Farrell & Schmidt, LLP

(57) ABSTRACT

A control apparatus configured to control a forming apparatus which forms concavo-convex structure by ejecting ink obtains concavo-convex data indicating the concavo-convex to be formed and divide the concavo-convex data into a plurality of pieces of data. The control apparatus controls a formation order, performed by the forming apparatus, of the concavo-convex portions each corresponding to the plurality of pieces of data divided by the dividing unit based on a feature amount of the concavo-convex indicated by the concavo-convex data.

16 Claims, 20 Drawing Sheets

(56) References Cited

U.S. PATENT DOCUMENTS

| | | |
|---|---|---|
| 2004/0207705 A1 | 10/2004 | Ozawa |
| 2010/0221504 A1 | 9/2010 | Bauer |
| 2011/0249048 A1* | 10/2011 | Gullentops ......... B29C 67/0059 347/5 |
| 2012/0165969 A1* | 6/2012 | Elsey ................. B29C 67/0085 700/120 |
| 2014/0125725 A1 | 5/2014 | Sakai |

FOREIGN PATENT DOCUMENTS

| | | | |
|---|---|---|---|
| JP | 2004-299058 A | 10/2004 | |
| WO | WO 2013167528 A1 * | 11/2013 | ......... B29C 67/0059 |

* cited by examiner

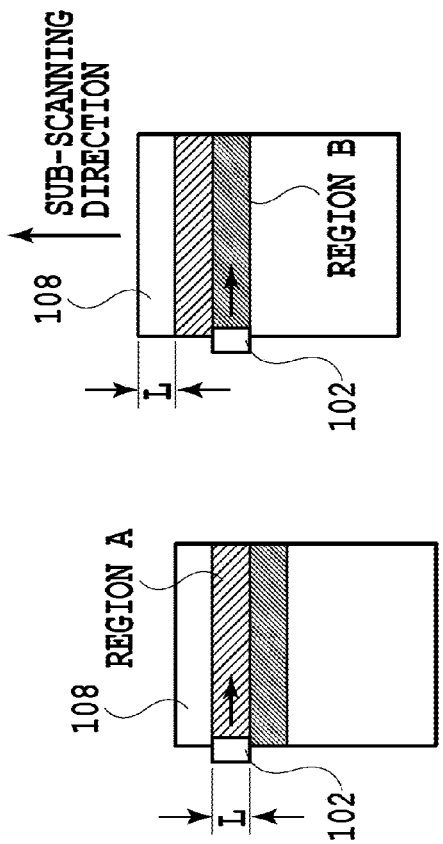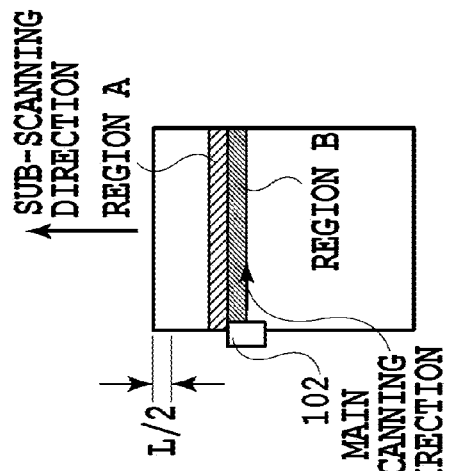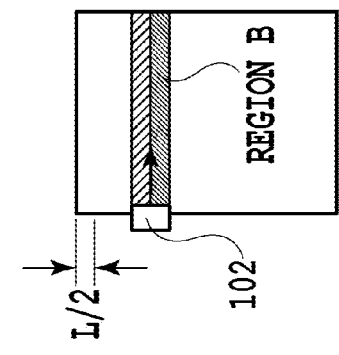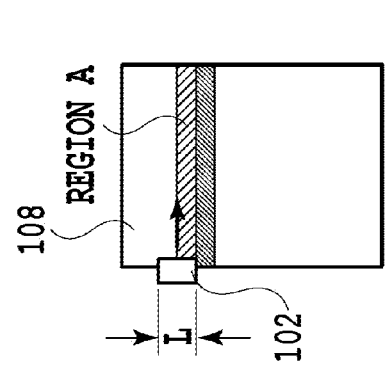

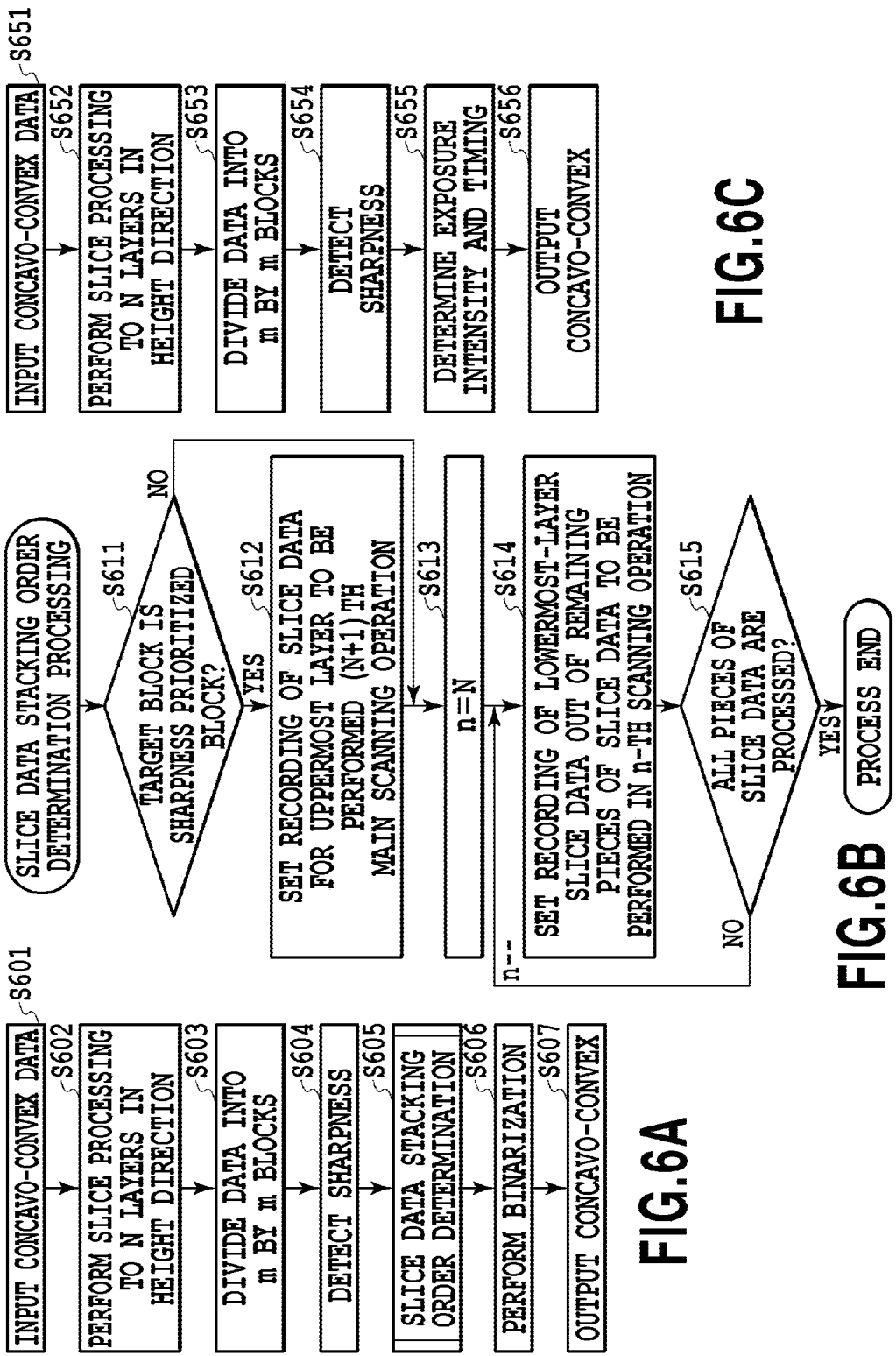

|  | x=1 | 2 | 3 | 4 | 5 | 6 | 7 |
|---|---|---|---|---|---|---|---|
| QUANTIZED INK AMOUNT I'  y=1 | 1 | 2 | 3 | 4 | 3 | 2 | 1 |

|  | x=1 | 2 | 3 | 4 | 5 | 6 | 7 |
|---|---|---|---|---|---|---|---|
| SLICE DATA 4  y=1 | 0 | 0 | 0 | 1 | 0 | 0 | 0 |
| SLICE DATA 3  y=1 | 0 | 0 | 1 | 1 | 1 | 0 | 0 |
| SLICE DATA 2  y=1 | 0 | 1 | 1 | 1 | 1 | 1 | 0 |
| SLICE DATA 1  y=1 | 1 | 1 | 1 | 1 | 1 | 1 | 1 |

FIG.11

☐ FIRST SCANNING OPERATION

▧ FOURTH SCANNING OPERATION

| 0 | 8 | 2 | 10 |
|---|---|---|---|
| 12 | 4 | 14 | 6 |
| 3 | 11 | 1 | 9 |
| 15 | 7 | 13 | 5 | matrix[1]

FIG.15A

| 16 | 24 | 18 | 26 |
|---|---|---|---|
| 28 | 20 | 30 | 22 |
| 19 | 27 | 17 | 25 |
| 31 | 23 | 29 | 21 | matrix[2]

FIG.15B

| 32 | 40 | 34 | 42 |
|---|---|---|---|
| 44 | 36 | 46 | 38 |
| 35 | 43 | 33 | 41 |
| 47 | 39 | 45 | 37 | matrix[3]

| 240 | 248 | 242 | 250 |
|---|---|---|---|
| 252 | 244 | 254 | 246 |
| 243 | 251 | 241 | 249 |
| 255 | 247 | 253 | 245 | matrix[16]

FIG.15D

| 0 | 8 | 2 | 10 |
|---|---|---|---|
| 12 | 4 | 14 | 6 |
| 3 | 11 | 1 | 9 |
| 15 | 7 | 13 | 5 |

FIG.16

| 16 | 16 | 16 | 16 |
|---|---|---|---|
| 16 | 16 | 16 | 16 |
| 16 | 16 | 16 | 16 |
| 16 | 16 | 16 | 16 |

FIG. 17A

| 1 | 1 | 1 | 1 |
|---|---|---|---|
| 1 | 1 | 1 | 1 |
| 1 | 1 | 1 | 1 |
| 1 | 1 | 1 | 1 |

FIG. 17B

| 24 | 24 | 24 | 24 |
|---|---|---|---|
| 24 | 24 | 24 | 24 |
| 24 | 24 | 24 | 24 |
| 24 | 24 | 24 | 24 |

FIG. 17C

| 2 | 1 | 2 | 1 |
|---|---|---|---|
| 1 | 2 | 1 | 2 |
| 2 | 1 | 2 | 1 |
| 1 | 2 | 1 | 2 |

FIG. 17D

FIG.19A FIRST PASS

| 1 | 1 | 1 | 1 |
|---|---|---|---|
| 1 | 1 | 1 | 1 |
| 1 | 1 | 1 | 1 |
| 1 | 1 | 1 | 1 |

FIG.19B SECOND PASS

| 1 | 0 | 1 | 0 |
|---|---|---|---|
| 0 | 1 | 0 | 1 |
| 1 | 0 | 1 | 0 |
| 0 | 1 | 0 | 1 |

FIG.19C THIRD PASS

| 0 | 0 | 0 | 0 |
|---|---|---|---|
| 0 | 0 | 0 | 0 |
| 0 | 0 | 0 | 0 |
| 0 | 0 | 0 | 0 |

FIG.20A N-VALUE DATA

| 2 | 1 | 2 | 1 |
|---|---|---|---|
| 1 | 1 | 1 | 1 |
| 2 | 1 | 2 | 1 |
| 1 | 1 | 1 | 1 |

FIG.20B 100%

| 1 | 1 | 1 | 1 |
|---|---|---|---|
| 1 | 1 | 1 | 1 |
| 1 | 1 | 1 | 1 |
| 1 | 1 | 1 | 1 |

FIG.20C 25%

| 1 | 0 | 1 | 0 |
|---|---|---|---|
| 0 | 0 | 0 | 0 |
| 1 | 0 | 1 | 0 |
| 0 | 0 | 0 | 0 |

FIG.20D 50%

| 1 | 0 | 1 | 0 |
|---|---|---|---|
| 0 | 1 | 0 | 1 |
| 1 | 0 | 1 | 0 |
| 0 | 1 | 0 | 1 |

FIG.20E 75%

| 1 | 1 | 1 | 1 |
|---|---|---|---|
| 1 | 0 | 1 | 0 |
| 1 | 1 | 1 | 1 |
| 1 | 0 | 1 | 0 |

CONTROL APPARATUS AND CONTROL METHOD FOR CONTROLLING FORMING APPARATUS WHICH FORMS CONCAVO-CONVEX STRUCTURE

BACKGROUND OF THE INVENTION

1. Field of the Invention

The present invention relates to a control apparatus and a control method for controlling a forming apparatus which forms a surface having concavo-convex or three-dimensional object.

2. Description of the Related Art

Various methods are known as a method for forming desired concavo-convex structure and three-dimensional objects. For example, there are known a method in which a material is carved with a carving machine or the like and a method in which materials such as curable resin and gypsum are stacked. Meanwhile, a method in which an image is printed on a surface of a three-dimensional object is also known. For example, there are known a method in which an image is printed on a special sheet in advance by using a printing apparatus such as an offset printer and the sheet is pasted onto a target three-dimensional object and a method in which color materials are ejected directly onto a three-dimensional object by using an inkjet recording method. Surface characteristics such as sharpness and smoothness of the shapes of such concavo-convex and three-dimensional objects greatly affect the appearance and impression of the concavo-convex and three-dimensional objects.

Moreover, Japanese Patent Laid-Open No. 2004-299058 discloses a method of obtaining a hard copy in which three-dimensional appearance and texture is expressed by performing concavo-convex formation and image formation substantially at the same time by using an inkjet method. The following method is generally employed to express the concavo-convex in the aforementioned method. The concavo-convex is formed by dividing the concavo-convex into multiple layers and printing each of the layers over another layer.

As described above, the sharpness and smoothness of the formed concavo-convex greatly affects the appearance of the outputted object. However, the sharpness and smoothness cannot be appropriately reproduced by the processing of simply dividing the concavo-convex structure into multiple layers and printing each of the layers over another layer.

For example, in a case where the concavo-convex structure is formed by performing printing multiple times, steps are sometimes clearly visible in the concavo-convex layers due to reasons such as displacement between the layers, spreading of the ink, and contraction characteristic in curing. If such roughness is formed in a case where a smooth inclined surface is desired to be reproduced, smoothness of the inclined surface is lost and a desired texture cannot be obtained.

Meanwhile, reproduction of acute angles (for example, a cross-sectional shape like saw teeth) is sometimes difficult depending on the surface tension and spreading characteristics of a material used to form the concavo-convex structure. In this case, a sharp shadow formed by the concavo-convex of the surface is lost and a desired texture cannot be obtained.

SUMMARY OF THE INVENTION

A control apparatus of the present invention configured to control a forming apparatus which forms concavo-convex structure by ejecting ink comprises an obtaining unit configured to obtain concavo-convex data indicating the concavo-convex structure to be formed, a dividing unit configured to divide the concavo-convex data into a plurality of pieces of data for a plurality of scanning, and a control unit configured to control the forming apparatus based on the plurality of pieces of data. The control unit controls a formation order, performed by the forming apparatus, of the concavo-convex portions each corresponding to the plurality of pieces of data divided by the dividing unit based on a feature amount of the concavo-convex indicated by the concavo-convex data.

Further features of the present invention will become apparent from the following description of exemplary embodiments (with reference to the attached drawings).

BRIEF DESCRIPTION OF THE DRAWINGS

FIGS. 3A to 3E are views for explaining an operation of forming concavo-convex or an image;

FIGS. 6A to 6C are flowcharts showing examples of processing of the concavo-convex forming apparatus in the embodiment;

FIG. 11 is a view showing an example of a quantized ink amount data and pieces of slice data in Embodiment 3;

FIGS. 15A to 15D are a view showing a matrix group used in the N-value processing in Embodiment 4;

FIG. 16 is a view showing a matrix which is a base of matrices in FIGS. 15A to 15D;

FIGS. 17A to 17D are views showing examples of N-value data generated by performing the N-value processing in Embodiment 4;

FIGS. 19A to 19C are views showing examples of binary division data generated from the N-value data of FIG. 17D; and FIGS. 20A to 20E are views showing examples of results of pass division in which ratio control in Embodiment 4 is performed.

DESCRIPTION OF THE EMBODIMENTS

An embodiment of the present invention is described below with reference to the drawings. Note that the embodiments described below do not limit the present invention described in the scope of claims, and not all of combinations of features described in the embodiments are necessary for solving method of the present invention.

Embodiment 1

Schematic Configuration of Concavo-Convex Forming Apparatus

Figure 1:
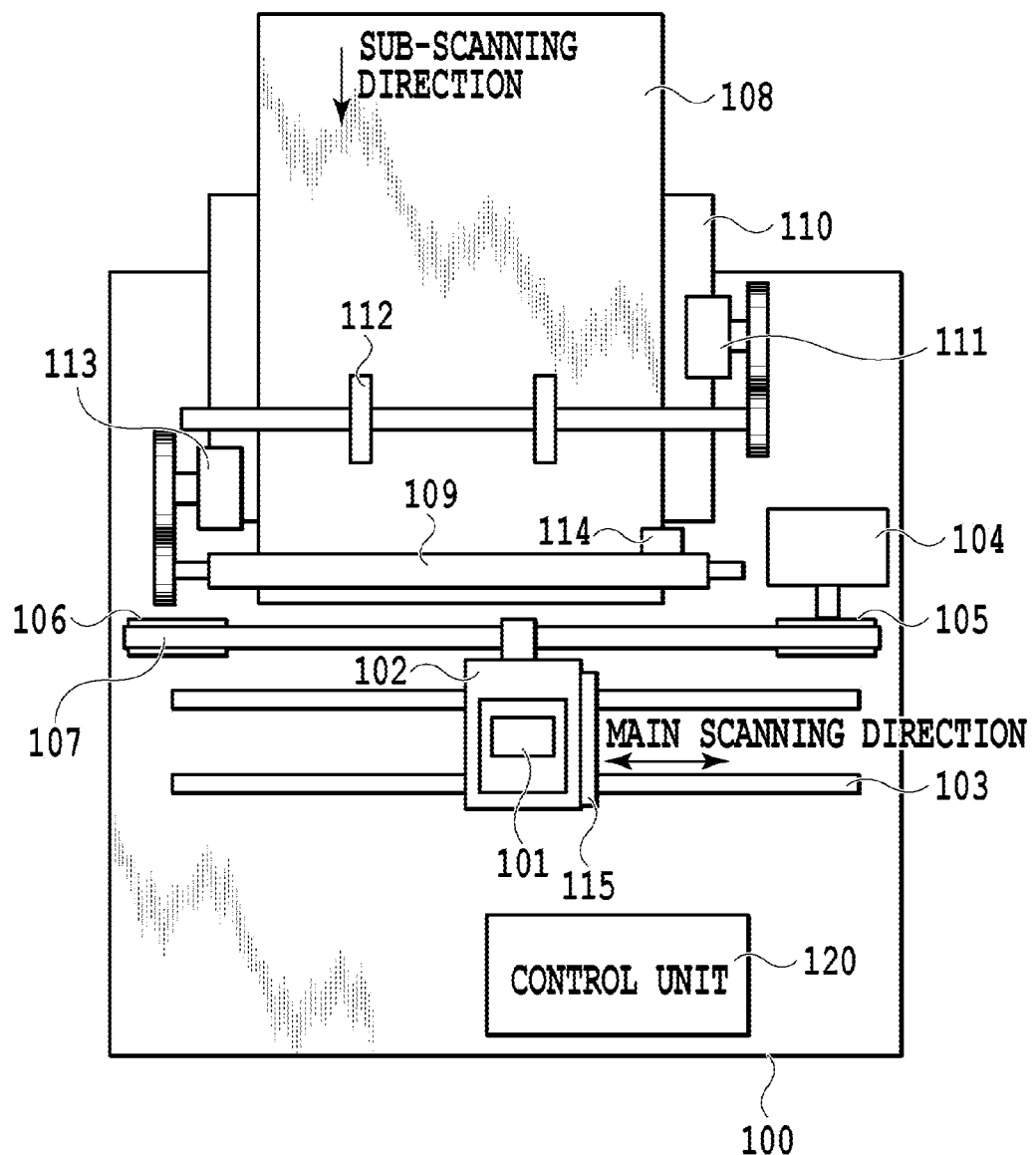
FIG. 1 is a view showing a configuration example of a concavo-convex forming apparatus in Embodiment 1.

FIG. 1 is a view showing a configuration example of a concavo-convex forming apparatus in the embodiment. An inkjet printer configured to record concavo-convex and images by using inks is described as an example of the concavo-convex forming apparatus 100. A head cartridge 101 has a recording head including multiple ejection ports and an ink tank configured to supply the inks to the recording head. Moreover, the head cartridge 101 is provided with a connector for receiving signals for driving the ejection ports of the recording head and the like.

For example, in the ink tank, total of six types of inks including a liquid resin ink used to form an concavo-convex layer and color inks of cyan, magenta, yellow, black, and white used to form an image layer are independently provided. For example, an ultraviolet curable ink is used as the liquid resin ink. The head cartridge 101 is aligned and mounted on a carriage 102 to be replaceable, and the carriage 102 is provided with a connector holder for transmitting drive signals and the like to the head cartridge 101 via the connector. Moreover, an ultraviolet light irradiation device 115 is mounted on the carriage 102 and is used to cure the ejected curable ink and fix the ink onto a recording medium.

The carriage 102 can reciprocate along guide shafts 103. Specifically, a main scanning motor 104 serving as a drive source drives the carriage 102 via drive mechanisms such as a motor pulley 105, a driven pulley 106, and a timing belt 107, and the position and movement of the carriage 102 is controlled. This movement of the carriage 102 along the guide shafts 103 is referred to as "main scanning," and the movement direction is referred to as "main scanning direction."

Recording media 108 such as print sheets are placed on an auto sheet feeder (hereafter, referred to as "ASF") 110. In image recording, pickup rollers 112 are rotated by drive of a sheet feeding motor 111 via gears, and the recording media 108 are separated from one another to be fed one by one from the ASF 110. Then, each of the recording media 108 is conveyed by rotation of a conveyance roller 109 to a recording start position at which the recording medium 108 faces an ejection port surface of the head cartridge 101 on the carriage 102. A line feed (LF) motor 113 serving as a drive source drives the conveyance roller 109 via gears.

Determination on whether the recording medium 108 is fed and final determination on the position of the recording medium 108 in the feeding is made at the time the recording medium 108 passes a paper end sensor 114. The head cartridge 101 mounted on the carriage 102 is held such that the ejection port surface protrudes downward from the carriage 102 and is parallel to the recording medium 108. A control unit 120 is formed of a CPU, a ROM, a RAM, and the like. The control unit 120 receives concavo-convex data indicating concavo-convex structure and image data and controls operations of various parts of the concavo-convex forming apparatus 100, based on the received data.

(Concavo-Convex Recording Operation and Image Recording Operation)

Description is given below of a concavo-convex recording operation and an image recording operation in the inkjet printer having the configuration shown in FIG. 1. First, the recording medium 108 is conveyed to a predetermined recording start position. Then, the carriage 102 is moved above the recording medium 108 along the guide shafts 103 and the inks are ejected from the ejection ports of the recording head while the carriage 102 is moved. The ultraviolet light irradiation device 115 delivers ultraviolet light along with the movement of the recording head to cure the ejected ink and fix the ink onto the recording medium. Then, at the point where the carriage 102 reaches one ends of the guide shafts 103, the conveyance roller 109 conveys the recording medium 108 by a predetermined amount in a direction perpendicular to the scanning direction of the carriage 102. This conveyance of the recording medium 108 is referred to as "sheet feeding" or "sub-scanning" and the direction of this conveyance is referred to as "sheet feeding direction" or "sub-scanning direction." After the conveyance of the recording medium 108 by the predetermined amount is completed, the carriage 102 is moved again along the guide shafts 103. Concavo-convex is formed on the entire recording medium 108 by repeating the scanning of the carriage 102 of the recording head and the sheet feeding as described above. After the concavo-convex is formed, the conveyance roller 109 returns the recording medium 108 to the recording start position and an image is formed on the concavo-convex by a process similar to that of the concavo-convex formation. Although the formation of the concavo-convex and the formation of the image is performed separately in the above description to simplify the explanation, it is possible to perform processing in which the order of ejecting the respective types of inks in each scanning operation is controlled such that the image layer is formed on the concavo-convex layer, and no returning of the recording medium is performed. Moreover, the concavo-convex layer may be formed after the image layer is formed.

Figure 2:
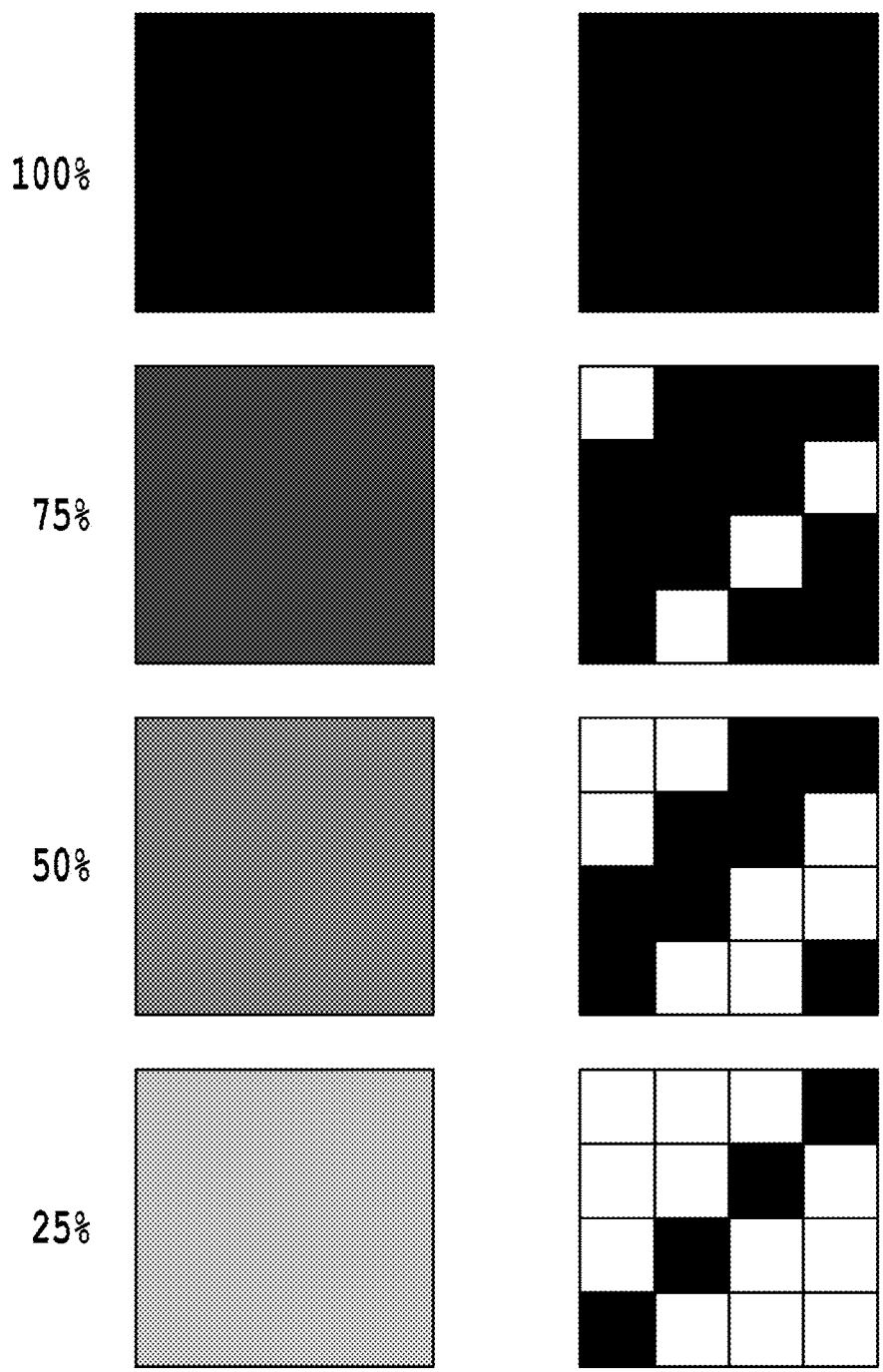
FIG. 2 is a schematic view showing a halftone expression in area coverage modulation.

FIG. 2 is a schematic view showing expressions of images which are controlled through area coverage modulation. The expression of images are achieved basically by performing binary control in which whether the recording head ejects an ink droplet is determined. In the embodiment, on-off control of the ink is performed for each of pixels defined for an output resolution of the concavo-convex forming apparatus, and a state where all of pixels in a unit area are set to ON is treated as an ink amount of 100%. In a so-called binary printer like one described above, only an ink amount of 100% or 0% can be expressed in one pixel. Accordingly, a halftone is expressed by a group of multiple pixels. In the examples shown in FIG. 2, instead of performing halftone expression in a density of 25% as in a lower left portion of FIG. 2, the ink is ejected to four pixels out of 4×4 pixels as in a lower right portion of FIG. 2 to express 4/16=25% in terms of area. Other tones can be expressed in a similar way. Note that the total number of pixels, patterns of pixels set to ON, and the like for expressing a halftone are not limited to those in the examples described above. Error diffusion processing and the like are popularly used.

In the concavo-convex formation of the embodiment, height control is performed for each position by using the concept of the ink amount described above. In a case where a substantially-uniform layer is formed at the ink amount of 100% in the concavo-convex formation, the layer has a certain thickness=height corresponding to the volume of the ejected ink. For example, in a case where a layer formed at the ink amount of 100% has a thickness of 20 μm, the thickness of 100 μm can be reproduced by stacking the layer five times. In other words, the amount of ink to be ejected to a position requiring a height of 100 μm is 500%. Note that, in a case where there is a layer in which the ink amount does not reach 100%, for example, in a case of forming a layer having a thickness of 10 μm, the ink may be ejected such that the ink amount of 50% is achieved in terms of area as described in FIG. 2.

FIGS. 3A to 3E are views for explaining an operation for forming concavo-convex or an image by causing the recording head to scan above the recording medium 108. Image recording of a region having a width equal to the width L of the recording head is performed with the main scanning of the carriage 102, and the recording medium 108 is conveyed by the distance L in the sub-scanning direction every time recording of one line is completed. To simplify the explanation, it is assumed that the concavo-convex forming apparatus in the embodiment can only perform ink ejection up to the ink amount of 100% in one scanning operation and, in a case of performing concavo-convex formation exceeding the ink amount of 100%, the scanning is performed multiple times on the same region without performing the conveyance. For example, in a case where the maximum ink amount to be ejected is 500%, the same line is scanned five times. This is explained by using FIGS. 3A and 3B. After a region A is scanned five times by the recording head (FIG. 3A), the recording medium 108 is conveyed in the sub-scanning direction and the main scanning is repeated five times for a region B (FIG. 3B).

Multiple times of scanning or so-called multi-pass printing is sometimes performed even in a case where the ink amount is 100% or less, to suppress image deterioration such as periodic concavo-convex due to the accuracy of the recording head. An example of two-pass recording is shown in FIGS. 3C to 3E. In this example, image recording of a region having a width equal to the width L of the recording head is performed with the main scanning of the carriage 102, and the recording medium 108 is conveyed by the distance L/2 in the sub-scanning direction every time recording of one line is completed. Recording in the region A is performed in the m-th main scanning operation (FIG. 3C) and the (m+1)th main scanning operation (FIG. 3D) of the recording head. Meanwhile, recording in the region B is performed in the (m+1)th main scanning operation (FIG. 3D) and the (m+2)th main scanning operation (FIG. 3E) of the recording head. Although description is given herein of the operations in the two-pass recording, the number of passes performed for recording can be changed depending on the desired quality and concavo-convex accuracy of an image to be recorded. In a case of performing n-pass recording, for example, the recording medium 108 is conveyed by the distance of L/n in the sub-scanning direction every time the recording of one line is completed. In this case, even if the ink amount is 100% or less, concavo-convex or an image is formed by dividing the concavo-convex or the image into multiple print patterns and causing the recording head to perform main scanning n-times on the same line of the recording medium. In the embodiment, in order to avoid confusion between the scanning for the aforementioned multi-pass printing and the scanning for ejecting the ink at an ink amount of 100% or greater, description is given assuming that the multi-pass printing is not performed and multiple times of scanning is performed to stack layers. Note that description that the multi-pass printing is not performed is given to avoid confusion, and a mode in which the multi-pass printing is performed can be employed as a matter of course.

In an inkjet printer, if the distance from the recording head to the recording medium is inappropriate, ink droplets are affected by air currents and the like and the landing position accuracy of the ink droplets sometimes cannot be maintained or the ink droplets sometimes do not adhere to the recording medium and scatter inside the apparatus. In a case of forming a shape in which the difference between a convex and a concave is great, an appropriate distance cannot be maintained. Accordingly, there is generally a limit to the height of the concavo-convex. In a case where the height exceeds the limit, clipping and compression is sometimes performed for an amount exceeding the height limit. Description is given assuming that the concavo-convex data handled in the embodiment has been already subjected to such processing.

Moreover, in the embodiment, the recording medium is not limited to a particular medium. Media made of various materials such as paper and plastic film are usable as long as the media can be subjected to the image recording by the recording head.

Figure 4:
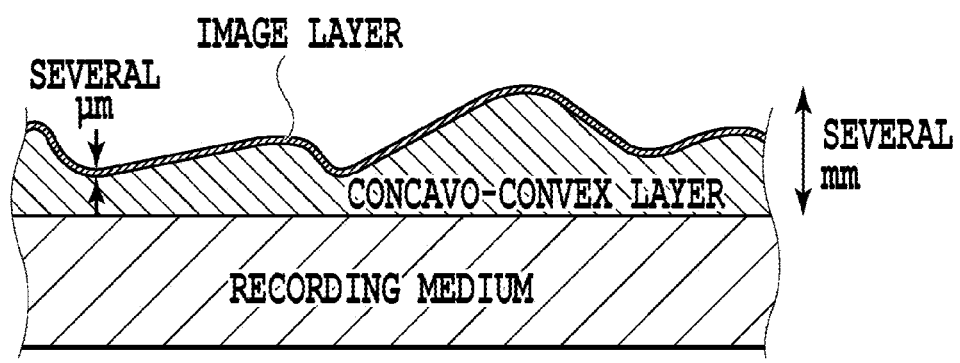
FIG. 4 is a view showing an example of cross-sections of a concavo-convex layer and an image layer formed on a recording medium.

FIG. 4 is a cross-sectional view of the concavo-convex layer for forming concavo-convex structure and the image layer for coloring which are formed on the recording medium. In the embodiment, description is given assuming that the image layer is formed on a surface of the concavo-convex layer whose height distribution is about 1 mm. Strictly speaking, the image layer also has a height distribution. However, since the thickness of the image layer is about several μm, an effect on the final concavo-convex is small and can be ignored. As a matter of course, it is possible to perform processing of correcting height data and the like in consideration of the thickness distribution of the image layer.

(Difference in Output Characteristics Depending on Method of Forming Concavo-Convex Layer)

FIGS. 5A to 5D are schematic views showing differences depending on printing conditions in the formation of the concavo-convex layer. In the embodiment, description is given of an example in which so-called slice data is generated by dividing the concavo-convex data for a plurality of layers and the ink is ejected based on the slice data. The slice data of the embodiment is data in which information indicating, for example, the height on a two-dimensional xy plane is arranged for each pixel as in the concavo-convex data. For example, the slice data is generated for each of layers with the height of a layer formable in one scanning operation being set as the upper limit. In other words, multiple pieces of slice data indicating the heights of the respective layers are generated by dividing the concavo-convex data for each scan.

Figure 5A:
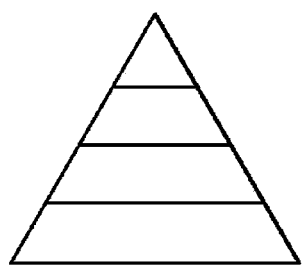
FIGS. 5A to 5D are schematic views showing an example of differences depending on printing conditions in formation of the concavo-convex layer.

FIG. 5A is a method generally used in concavo-convex formation by way of stacking. The method of FIG. 5A is a method in which the inputted concavo-convex data is divided along contour lines to generate pieces of slice data, and layers of ink are stacked up from an ink layer corresponding to a lower layer in the data and become higher as the number of times of scanning increases. Meanwhile, FIG. 5B shows a method as follows. Data is divided along lines in each of which the distance from the surface of an concavo-convex face (upper two sides of each triangle in the drawing) in a direction toward the recording medium surface is the same at any point on the line, and a layer corresponding to data close to the concavo-convex surface is formed in a later scanning operation. In a case where the aforementioned pieces of data are converted into an ink amount per unit area which is required on each xy plane, the data for the uppermost layer subjected to division in the method of FIG. 5B is the same as the slice data for the lowermost layer generated in FIG. 5A. In other words, the pieces of data subjected to division in FIG. 5B are equivalent to the pieces of slice data generated in the method of FIG. 5A which are rearranged such that the stacking order thereof is reversed. To put it differently, FIG. 5B is an example in which the scanning order is changed such that the slice data for a lower layer is recorded in scanning of a later stage and the slice data for an upper layer is recorded in scanning of an earlier stage.

The total amount of ink to be ejected in FIG. 5A is the same as that of FIG. 5B. However, the amount of ink stacked in each scanning operation is different in FIGS. 5A and 5B. Due to this difference, the shape of concavo-convex to be finally formed sometimes varies. Examples of the shapes of concavo-convex outputted by the stacking methods of FIGS. 5A and 5B are shown in FIGS. 5C and 5D, respectively.

The ejected ink is irradiated with ultraviolet light from the ultraviolet light irradiation device and is cured in each scanning operation. Droplets of the ejected ink do not have fixed shapes such as rectangular solids which can be digitally stacked up. The droplets thus spreads on the recording medium or a concavo-convex layer formed in the previous scanning operation. Moreover, the droplets are cured by being irradiated with ultraviolet light while spreading. The shapes of the cured ink droplets are affected by the physical properties and shape of the layer under the droplets, the timing of curing, and the like.

Figure 5C:
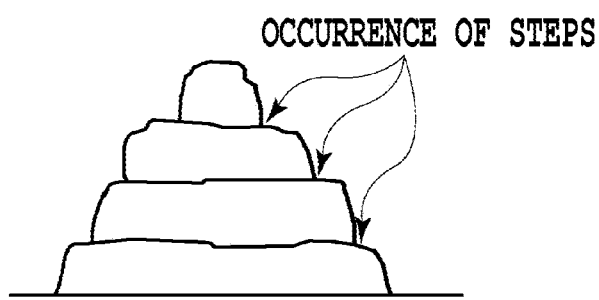
Figure 5B:
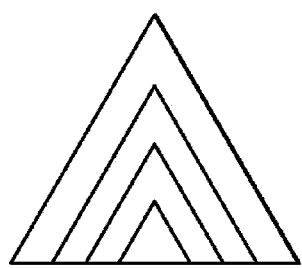
Figure 5D:
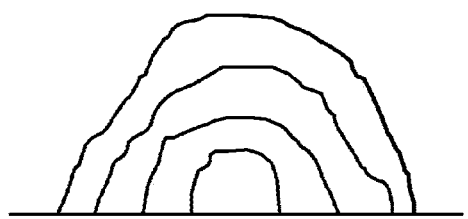

In FIG. 5C, the area of a layer formed by a scanning operation in a later stage is equal to or smaller than the area of a lower layer. Accordingly, steps are formed between the layers. Meanwhile, in FIG. 5D, a layer formed by a scanning operation in a later stage is formed by ejecting the ink in terms of area equal to or larger than the area of a lower layer, and thereby covers the lower layer to form relatively-smooth inclined surfaces.

Observing the aforementioned differences in shapes from the view point of the height of concavo-convex and the sharpness of a convex portion, a decrease of the height is small in FIG. 5C because the amount of ink flowing down is relatively small. Moreover, in FIG. 5C, the deterioration in the angle (spreading) of a top portion of the inputted triangular concavo-convex data is relatively small, and the method of FIG. 5C is advantageous in many cases. Meanwhile, in FIG. 5D, since the ink of an upper layer covers a lower layer and the amount of ink flowing down is relatively large, the height becomes lower than that of FIG. 5C. Moreover, although relatively smooth inclined surfaces with few steps are formed in FIG. 5D, the angle of the top portion is deteriorated.

As described above, concavo-convex characteristics such as smoothness and sharpness depend on material properties and formation processes. Accordingly, in the embodiment, away in which layers of ink are stacked is controlled based on characteristics (smooth concavo-convex structure is suitable or sharp concavo-convex structure is suitable) of concavo-convex expressed by the inputted concavo-convex data.

As described above, the slice data is data indicating the height of each layer, and is generated for each layer. For example, in a case where a layer formed at the ink amount of 100% has a thickness of 20 μm, the upper limit of the height is 20 μm in the slice data for one layer. In this case, the slice data for one layer includes a pixel of 20 μm, a pixel of 0 μm, and a pixel of 10 μm. In other words, multiple levels of height can exist in the slice data for one layer. Since the multiple levels of height in the sliced layer for one layer is controlled by on and off of ink droplets, stochastic control is actually performed as described by using FIG. 2. Specifically, controlling multiple levels of height in an area enables ejection of ink droplets corresponding to multiple levels of heights. In a case where an ink which spreads widely is used, such control leads to reduction of concavo-convex in units of pixels, and the levels of height are averaged among multiple pixels. Accordingly, multiple levels of heights can be expressed in units of multiple pixels. Meanwhile, in a case where an ink which does not spread widely is used, such control may cause unintended concavo-convex on the surface, i.e. roughness. In order to avoid this, it is possible to use a method in which binarization processing is performed for each piece of slice data without performing halftone processing in the concavo-convex formation and the height is controlled based only on the number of stacked layers. In the embodiment, description is given of an example in which the halftone processing (area coverage modulation processing) is performed in the concavo-convex formation. In Embodiment 3 to be described later, description is given of a method in which the binarization processing is performed for each piece of slice data without performing the halftone processing in the concavo-convex formation and the height is controlled based only on the number of stacked layers.

(Flow of Concavo-Convex Layer Formation)

FIGS. 6A to 6C are views showing flowcharts. FIG. 6A is a flowchart showing an operation of the concavo-convex forming apparatus in the embodiment. For example, the operation of this flowchart is implemented by causing the CPU to execute a program stored in the not-illustrated ROM forming the control unit 120.

First, in step S601, the control unit 120 obtains the concavo-convex data which is a set of information on the height at each set of coordinates x, y.

Next, in step S602, the control unit 120 converts the concavo-convex data obtained in step S601 to an ink amount in each pixel and divides the converted data into pieces of data at predetermined contour lines. Hereafter, each of the pieces of data obtained by dividing the concavo-convex data is referred to as slice data. The intervals of the contour lines correspond to the upper limit of the height in the slice data, i.e. the ink amount of 100%.

Figure 7:
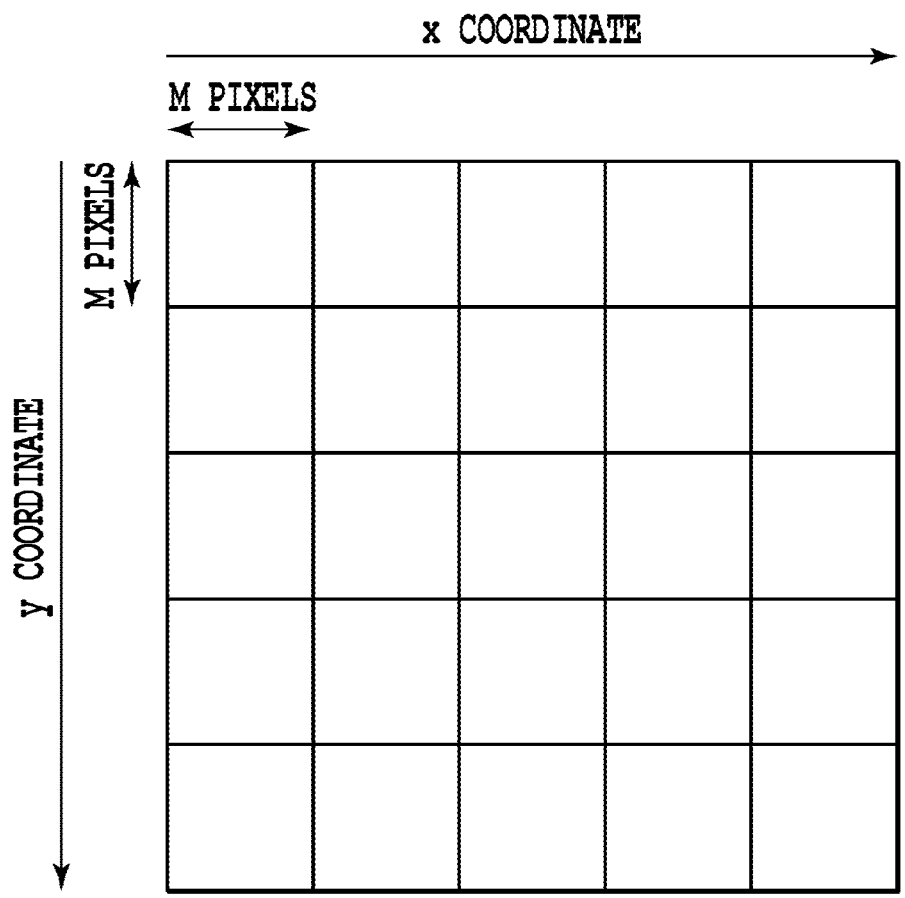
FIG. 7 is a schematic view showing an example of blocks obtained by dividing the concavo-convex data in Embodiment 1.

Then, in step S603, the control unit 120 divides the concavo-convex data obtained in step S601 into blocks of a predetermined size on the xy plane. FIG. 7 is a schematic view showing the concavo-convex data and the blocks obtained by the division. Determination on "which one of sharpness and smoothing is to be prioritized in the concavo-convex to be formed" and control based on this determination, which is to performed in the following steps, is performed in units of the blocks obtained by the division in step S603. In this case, the output resolution of the concavo-convex formation is set to 600 dpi, and blocks each having a size of 128 pixels by 128 pixels are used. The size of the blocks is not limited to this and can be set as appropriate to a size of m pixels by m pixels corresponding to a size of several mm to 1 cm square in the output. The shape of the blocks may be a shape other than a quadrate, as a matter of course.

Next, in step S604, the control unit 120 determines a feature amount of the concavo-convex indicated by the concavo-convex data, for each of the blocks obtained by the division in step S603. For example, the control unit 120 determines the degree of sharpness. In this case, the control unit 120 applies a Laplacian filter to the divided two-dimensional concavo-convex data, and determines whether the priority is given to sharpness or smoothness in this region by comparing the data with a predetermined threshold. For example, the control unit 120 determines that an edge portion is a sharpness prioritized region and a non-edge portion is a smoothness prioritized region. Then, as will be described later, operations to be performed are switched between an operation for a region having a predetermined feature amount and an operation for a region having a feature amount other than the predetermined feature amount.

The method of steps S603 and S604 is one of methods for determining which one of sharpness and smoothing is to be prioritized in each of predetermined regions, and many methods other than the one described above are conceivable. For example, a frequency component may be used. Sharpness may be detected by using, for example, a method in which Fourier transform or the like is utilized to extract only the high-frequency components. Moreover, instead of dividing the data into rectangular regions, the region division can be performed by using a range of a certain distance from the extracted high-frequency components on the real space as a mask.

Figure 8:
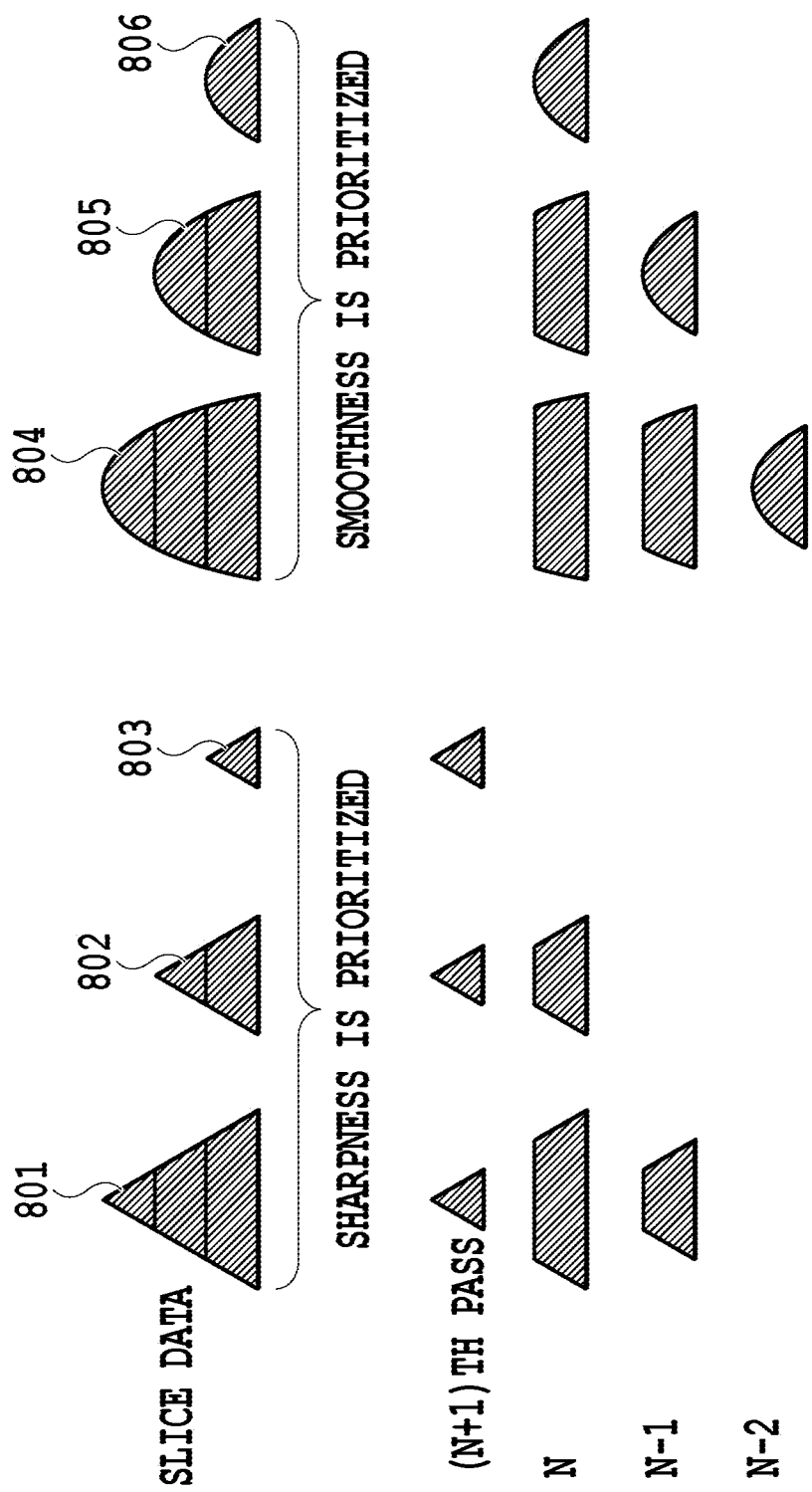
FIG. 8 is a schematic view showing pieces of slice data obtained by dividing the inputted concavo-convex data and examples of the stacking order determined by processing in Embodiment 1.

In step S605, the control unit 120 determines the stacking order of the pieces of slice data generated by dividing the concavo-convex data in step S602, based on the degree of sharpness determined in step S604. FIG. 6B is a flowchart showing an example of an operation performed in step S605. Here, a case where the inputted concavo-convex data is data for N layers is given as an example. In other words, concavo-convex indicated by the concavo-convex data can be formed by stacking N layers. Description is given of an example in which the concavo-convex indicated by the data for N layers is formed by performing the main scanning N+1 times. Refer also to FIG. 8. In this example, assuming that there is slice data to be used in the n-th main scanning operation, n is the scanning number of this slice data. The processing of FIG. 6B is performed for each of the blocks obtained by the division in step S603.

In step S611, the control unit 120 determines whether a target block is a sharpness prioritized block. This determination is performed based on the detection result of sharpness obtained in step S604. In a case where the target block is a sharpness prioritized block, in step S612, the control unit 120 sets up the slice data such that the slice data for the uppermost layer in the target block is recorded in the (N+1)th main scanning operation. Specifically, the control unit 120 sets the scanning number of the slice data for the uppermost layer in the target block to n+1, so that the slice data for the uppermost layer is recorded in the last scanning operation. Then, the control unit 120 sequentially determines the scanning numbers of other pieces of slice data, from the slice data used in a main scanning operation in a later stage (upper layer), like n=N, N−1, . . . , 1. The slice data used in the n-th main scanning operation is lowermost-layer slice data out of pieces of slice data whose scanning numbers are not determined yet. This operation is repeated until the scanning numbers are determined for all pieces of slice data. In other words, in steps S613 and S614, the control unit sets up the concavo-convex forming apparatus such that the lowermost-layer slice data out of pieces of slice data whose scanning numbers are not determined yet is recorded in the n-th scanning operation corresponding to a scanning operation in a later stage. If the processing for all pieces of slice data are not completed in step S615, n is decremented and the processing returns to step S614.

In a case where the target block is not a sharpness prioritized block in step S611, similar processing is performed with the processing of determining the slice data for the (N+1)th main scanning operation in step S612 being omitted.

In the processing of FIG. 6B, in a block in which the priority is given to the degree of sharpness, the slice data for the uppermost layer which is a sharp portion is recorded in the last scanning operation. Accordingly, concavo-convex in which the sharpness is maintained can be formed. Meanwhile, regarding the pieces of slice data for layers other than the uppermost layer, the slice data for a lower layer is set to be recorded in a main scanning operation in a later stage. Accordingly, it is possible to form concavo-convex with a high degree of smoothness in which steps are eliminated. In other words, it is possible to form concavo-convex which has both of a high degree of sharpness and a high degree of smoothness.

Meanwhile, in a block in which the priority is not given to the degree of sharpness (i.e. a block in which the priority is given to the degree of smoothness), the slice data for a lower layer is set to be recorded in a main scanning operation in a later stage. Accordingly, it is possible to form concavo-convex with a high degree of smoothness in which steps are eliminated.

After the stacking order of the pieces of slice data is determined as described above for all blocks, in step S606, the control unit 120 performs quantization (binarization) by which on and off of the ink for each pixel is determined. Specifically, a value (FIG. 2) controlled through the area coverage modulation and corresponding to the ink amount indicated in data for each block is allocated to each pixel. Such quantization processing is performed in each block for each piece of slice data. Note that the area coverage modulation processing may be performed in each of blocks obtained by the division in step S603 or each of sub-blocks obtained by further dividing the block.

Next, in step S607, the control unit 120 performs concavo-convex formation based on the stacking order determined in step S605 and the binary data indicating on and off of the ink and determined in step S606. For example, in a case where the binary data to be used in a certain main scanning operation includes a block in which the stacking order is changed, the binary data after the stacking order change is used for this block. Moreover, an image can be printed on the formed concavo-convex as needed.

FIG. 8 is a schematic view showing pieces of slice data obtained by dividing the inputted concavo-convex data with N=3 being satisfied and the stacking order determined by the processing described above. Concavo-convex portions 801, 802, and 803 of FIG. 8 are processing examples of blocks which are determined to be sharpness prioritized blocks in step S604. In each of these blocks, the slice data for the uppermost layer is recorded in the last main scanning operation to prevent deterioration of sharpness at an apex of a triangle. Moreover, layers below the uppermost layer are stacked in such a way that steps are less visible. Meanwhile, concavo-convex portions 804, 805, and 806 of FIG. 8 in which the priority is not given to the degree of sharpness do not have shapes desired to be reproduced with sharpness maintained as in an apex of a triangle. In other words, the concavo-convex portions 804, 805, and 806 are in regions outside regions of sharp portions. Accordingly, in these portions, the slice data for a layer having a larger area is set to be formed in a main scanning operation in a later stage, and smooth concavo-convex in which steps are less visible are formed.

In the flowchart of FIG. 6B and the example of the concavo-convex portion 801 in FIG. 8, description is given of the example in which, in the sharpness prioritized block, the slice data for the uppermost layer is recorded in the last scanning operation, and pieces of slice data for layers other than the uppermost layer are recorded such that slice data for a lower layer is recorded in a main scanning operation performed in a later stage. However, the recording operation is not limited to this example. For example, in the sharpness prioritized block, the pieces of slice data can be recorded sequentially from slice data for a lower layer by performing main scanning operations. In other words, in the example of the concavo-convex portion 801 in FIG. 8, the order of the N-th pass and the (N−1)th pass may be interchanged. Moreover, the recording order of pieces of slice data for layers other than the uppermost layer in the sharpness prioritized block may be changed as necessary depending on the degree of spreading of the ink.

As described above, the concavo-convex forming apparatus of the embodiment is capable of forming a suitable concavo-convex shape by controlling a formation pattern for each block depending on the sharpness of the inputted concavo-convex data.

In the embodiment, description is given of the method for controlling the stacking order of the pieces of slice data depending on the degree of sharpness of the concavo-convex. However, a method in which the control of the stacking order of the pieces of slice data is achieved simply by changing the stacking order to the ascending or descending order of the area is conceivable.

Moreover, in the embodiment, the concavo-convex data is converted into pieces of slice data by using contour lines corresponding to the ink amount of 100%. However, a method of dividing the concavo-convex at lines corresponding to an ink amount of less than 100% is conceivable. Furthermore, instead of using contour lines, the ink amount at which the concavo-convex data is divided may vary among positions.

Moreover, the correspondence between the slice data and the scanning number are not limited to the example shown in FIGS. 6B and 8. In the embodiment, regarding the characteristics of the concavo-convex to be finally formed, the order of stacked layers is important and there is no need to assign specific scanning numbers to the respective pieces of slice data. For example, in blocks such as the concavo-convex portions 803 and the concavo-convex portion 806 of FIG. 8, the formation thereof may be performed in a scanning operation of any number. Moreover, although the concavo-convex portions 801, 802, and 803 of FIG. 8 shows examples in which the slice data for the uppermost layer is formed in the (N+1)th pass, it is possible to shift the entire formation operation by one pass and form the slice data for the uppermost layer in the N-th pass.

In the embodiment, the concavo-convex data is described to be divided into multiple pieces of slice data in advance to simplify the explanation. However, the method of the present invention is not limited to this. For example, a method may be employed in which subtraction from the concavo-convex data stored in the control unit 120 is performed every scanning operation.

Moreover, in the embodiment, description is given of the stacking order of pieces of slice data and the method in which the total amount of the ink in the slice data is not changed, i.e. the method in which the volume is maintained. However, the method of the present invention is not limited to this. For example, in a case of covering a lower layer in a main scanning operation in a later stage as in FIG. 5D, a desired height sometimes cannot be obtained. In such a case, the height of the concavo-convex to be formed may be compensated by performing control of ejecting a greater amount of ink. Moreover, it is possible to perform processing of compensating the degree of sharpness by forming portions of concavo-convex on the entire surface of the recording medium as in FIG. 5D and then forming only sharp portions (for example, convex portions such as an apex of a triangle) in the last main scanning operation.

Moreover, although the order of formation is controlled depending on the degree of sharpness of the concavo-convex data in the embodiment, it is possible to employ a method for controlling the order based on other feature values such as the degree of importance of height accuracy, the degree of importance of inclination angle accuracy, color and frequency of an image to be printed on a surface, and the like.

Embodiment 2

In Embodiment 1, description is given of the method in which the surface characteristics of the concavo-convex to be formed are controlled by dividing the concavo-convex into multiple layers and changing the way of stacking the layers as the operation condition of the concavo-convex formation. In the embodiment, description is given of a method in which the surface characteristics of the concavo-convex is controlled by controlling the illumination intensity and timing of an ultraviolet light irradiation device as the operation condition of the concavo-convex formation. Note that the configurations and operations of a concavo-convex forming apparatus in the embodiment are the same as those shown in Embodiment 1 unless otherwise noted, and description thereof is thus omitted.

Figure 9:
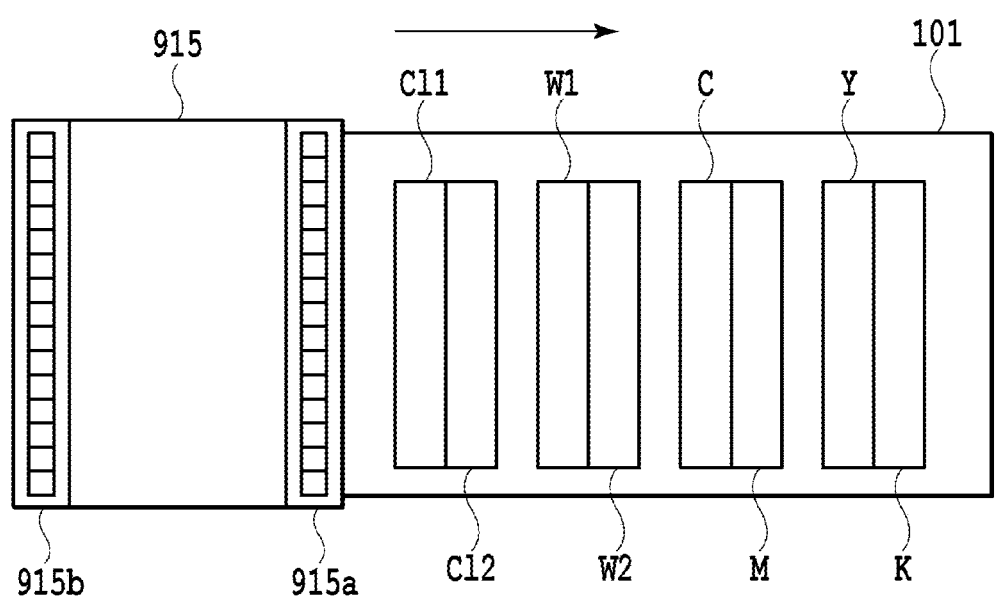
FIG. 9 is a schematic view showing a configuration example of a head cartridge and an ultraviolet light irradiation device in Embodiment 2.

FIG. 9 is a schematic view showing configurations of the head cartridge 101 and an ultraviolet light irradiation device 915 in the embodiment. The head cartridge 101 and the ultraviolet light irradiation device 915 are fixed to the carriage 102 and perform ejection of inks and ultraviolet light irradiation while moving in the direction of the arrow in the drawing in print scanning. The ultraviolet light irradiation device 915 includes two light emitting portions. The distance to the head cartridge 101 is different between the two light emitting portions. The time from the ink ejection to the ultraviolet light exposure is different between the light emitting portion 915a at a position close to the head cartridge 101 and the light emitting portion 915b at a position farther away from the head cartridge 101.

Figure 10A:
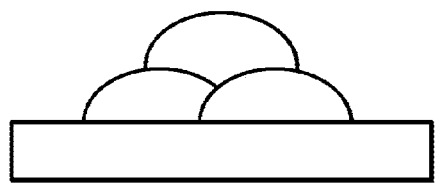
FIGS. 10A and 10B are schematic views showing differences in formed concavo-convex in a case where the time from ink ejection to ultraviolet light exposure is varied.
Figure 10B:
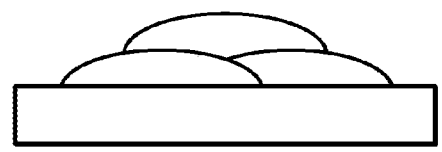

FIGS. 10A and 10B are schematic views showing differences in formed concavo-convex in a case where the time from the ink ejection to the ultraviolet light exposure is varied. FIG. 10A shows an example of a case where the time from the ejection to the exposure is relatively short and FIG. 10B shows an example of a case where the time from the ejection to the exposure is relatively long. Ink droplets ejected from the recording head come into contact with the recording medium or ink of a lower layer and then spread. In the example of FIG. 10A, the ink is cured before sufficiently spreading. Accordingly, the height of the ink is great but steps are likely to be formed. Meanwhile in the example of FIG. 10B, the ink is cured after spreading to some extent. Accordingly, the height of the ink is not great but steps are less likely to be formed.

Next, description is given of an operation of the concavo-convex forming apparatus in the embodiment by using FIG. 6C. Since steps S651 to S654 are the same operations as steps S601 to S604 in Embodiment 1, description thereof is omitted.

In step S655, the control unit 120 determines an exposure intensity and an exposure timing in concavo-convex output performed in step S656 of a later stage, for each of blocks obtained by division in step S653, based on the degree of sharpness determined in step S654. In a case where the priority is given to the degree of sharpness in step S654, the exposure is performed immediately after the ejection by using the light emitting portion 915a for a corresponding block. Meanwhile, in a case where the priority is not given to the degree of sharpness, the exposure is performed after a certain time elapses from the ejection by using the light emitting portion 915b for the corresponding block. In the embodiment, the stacking order of the pieces of slice data may be the same in all of the blocks.

As described above, the concavo-convex forming apparatus of the embodiment can form a suitable concavo-convex shape by controlling ink curing for each block depending on the sharpness of the inputted concavo-convex data.

In the embodiment, description is given of the method in which the light emitting timings of the two light emitting portions are controlled. However, it is possible to form the light emitting portions with a light emitting element array capable of controlling the light amount of each position and use a method in which the light emitting timing at each position in the array is controlled. Moreover, it is also possible to perform multi-value control by controlling the intensity of the two light emitting portions in multiple levels and controlling the ratio between the two light emitting portions.

Moreover, in the embodiment, description is given of the method in which the light emitting timings are controlled by using the two light emitting portions. However, a method using only one light emitting unit can be employed. In this method, the exposure is performed in a scanning operation different from that for the ink injection, and the time and the like for curing is controlled by controlling the timing of this scanning operation.

Furthermore, in the embodiment, description is given of the control of the surface characteristics of concavo-convex achieved by controlling the intensity of the emitted light and the timing of light emission by the ultraviolet light irradiation device. However, similar effects can be also obtained by using multiple types of inks with different ink characteristics such as viscosity, thixotropic property, and curing rate.

For example, the following method may be employed. Two types of inks of an ink C11 with high viscosity and an ink C12 with low viscosity are used as the ink for concavo-convex formation stored in the head cartridge 101. In the concavo-convex formation, an usage ratio between the inks is controlled depending on the degree of sharpness of the concavo-convex data and the like in such a way that a great amount of the ink C11 is used in a case where the priority is given to the degree of sharpness and a great amount of the ink C12 is used in a case where the priority is given to the degree of smoothness.

Moreover, a method can be employed in which the control of the stacking method described in Embodiment 1 and the control of the curing timings and the ink types described in Embodiment 2 are combined to control the surface characteristics of the outputted concavo-convex depending on the feature value of the concavo-convex data.

Embodiment 3

In Embodiment 1, description is given assuming that the pieces of slice data to be stacked are pieces of multi-value data in the method in which the surface characteristics of the concavo-convex to be formed are controlled by dividing the concavo-convex into multiple layers and changing the way the layers are stacked. In the embodiment, description is given of an example for a shaping method in which, for example, multi-value expression in a layer is not possible. In other words, in the embodiment, description is given of an example using binarized slice data.

Configurations and operations of a concavo-convex forming apparatus in the embodiment are the same as those shown in Embodiment 1, except for the point that binarization processing is performed on the concavo-convex data in step S602.

In the embodiment, the control unit 120 receives, from the outside, concavo-convex data h(x, y) which is a set of information on the height at each set of coordinates x, y, and then generates binarized slice data. For example, the control unit 120 converts the concavo-convex data h(x, y) into an ink amount I(x, y) by using a formula (1)

$$I(x,y)=k \times h(x,y) \qquad \text{formula (1)}$$

In this formula, k is a coefficient expressing a relationship between the height and the ink amount. The ink amount I of 100% is equal to 1.0 as described in Embodiment 1 and corresponds to the thickness of one layer. For example, in a concavo-convex forming apparatus in which the thickness of one layer is 20 μm, k is 1/20 μm. In a case where the concavo-convex data of the height of 50 μm is inputted in this apparatus, the ink amount I is 2.5.

Next, the ink amount converted by using the formula (1) is quantized in units of layer thickness by using, for example, a formula (2)

$$I'(x,y)=\text{floor}(I(x,y)) \qquad \text{formula(2)}$$

In this formula, floor is a function for performing rounding-off in a negative direction. For example, in a case where the inputted ink amount I is 2.5, the ink amount is rounded off to 2. Although the ink amount is rounded off in the negative direction in the aforementioned quantization processing, a method in which the ink amount is rounded off in a positive direction or to the closest integer can be employed.

That is the differences from the operation of Embodiment 1.

FIG. 11 is a view in which examples of a quantized ink amount I' of 1×7 pixels and divided pieces of slice data are expressed in a matrix. The slice data for the lowermost layer is assumed to be slice data 1.

Figure 12A:
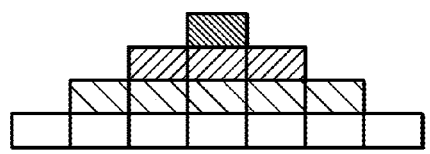
FIGS. 12A to 12D are schematic views showing differences in the shape of concavo-convex depending on stacking order control in Embodiment 3.
Figure 12C:
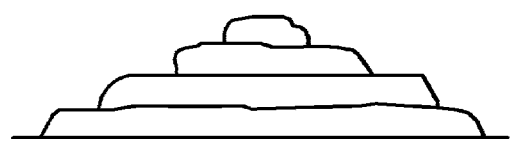
Figure 12B:
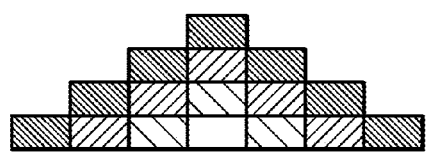
Figure 12D:

FIGS. 12A to 12D are schematic views showing differences in the shape of concavo-convex depending on the control of the stacking order of the pieces of slice data shown in FIG. 11. In FIGS. 12A and 12B, the types of shades used to hatch the blocks indicate the scanning operations in which the blocks are formed: the darker the shade is, the later the scanning operation is performed. FIG. 12A shows an example in which the slice data 1 for the lowermost layer is formed in the first scanning operation and the slice data 4 for the upper most layer is formed in the fourth scanning operation, and shows a generally-used method in which the concavo-convex is formed from slice data for a lower layer and patterns of smaller areas are stacked up. Meanwhile, FIG. 12B shows a method in which the slice data 4 for the uppermost layer is used in the first scanning operation and a pattern of a large area corresponding to the slice data 1 is formed later to cover the other patterns. FIGS. 12C and 12D are schematic views showing the shapes of concavo-convex formed by the stacking methods of FIGS. 12A and 12B, respectively. In the examples of FIGS. 12A to 12D, the concavo-convex of FIG. 12D has better smoothness but decrease in height is more apparent in FIG. 12D due to the same reasons as those in the concavo-convex shapes shown in FIGS. 5A to 5D. As described above, it is possible to control the surface characteristics of a concavo-convex shape by controlling the stacking order by using quantized concavo-convex data, i.e. a pattern binarized in the slice data. Moreover, since determination of the degree of sharpness and the like can be performed based on the concavo-convex data before quantization even if the ink amount after the quantization is the same, more preferable concavo-convex reproduction can be performed also in a shaping method in which multi-level expression cannot be performed in a layer.

Embodiment 4

In Embodiment 1, description is given of the example in which the processing shown in the flowchart of FIG. 6A is performed in a case of performing the control of the area coverage modulation. Specifically, description is given of the example in which pieces of slice data are generated by dividing the inputted concavo-convex data and then a pattern (binary data indicating on and off of the ink) controlled through the area coverage modulation is assigned to each piece of slice data having a thickness corresponding to the ink amount of 25%, 50%, or the like.

In the embodiment, the inputted concavo-convex data is not divided into pieces of slice data. Instead, N-value processing of determining the number of times of ink ejection is performed on the concavo-convex data, and then processing (binarization) of allocating N-value data to each pass is performed. Specifically, in Embodiment 1, division into pieces of data (slice data) for respective passes is performed in the stage of the concavo-convex data. Meanwhile, in the embodiment, the number of times of ink ejection for each pixel is determined from the concavo-convex data and then at which pass the ink is to be ejected is determined later. In this description, N is an integer equal to or greater than two.

Figure 13:
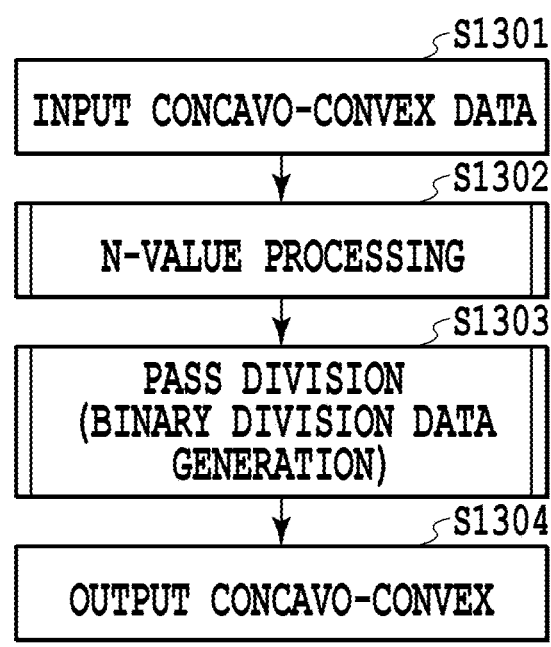
FIG. 13 is a flowchart showing an example of processing in Embodiment 4.

FIG. 13 is a flowchart in the embodiment. The processing of FIG. 13 is also implemented by causing the CPU forming the control unit 120 to read and execute a program stored in the not-illustrated ROM. In the embodiment, description is given of a case where concavo-convex of less than 16 layers (ink amount of less than 1600%) is formed.

First, in step S1301, the control unit 120 receives the concavo-convex data which is a set of information on the height at each set of coordinates x, y, from the outside. The concavo-convex data is assumed to be written in 8-bits (0, 1, . . . , 255). In the concavo-convex data, the thickness of one layer is coded in 16 levels. For example, in a case where a layer formed at the ink amount of 100% has a thickness of 20 μm, 4 indicates a thickness of 5 μm, 8 indicates a thickness of 10 μm, 16 indicates a thickness of 20 μm, 24 indicates a thickness of 30 μm. 256 levels can be expressed in 8-bit data up to layers less than 16 layers.

Figure 14:
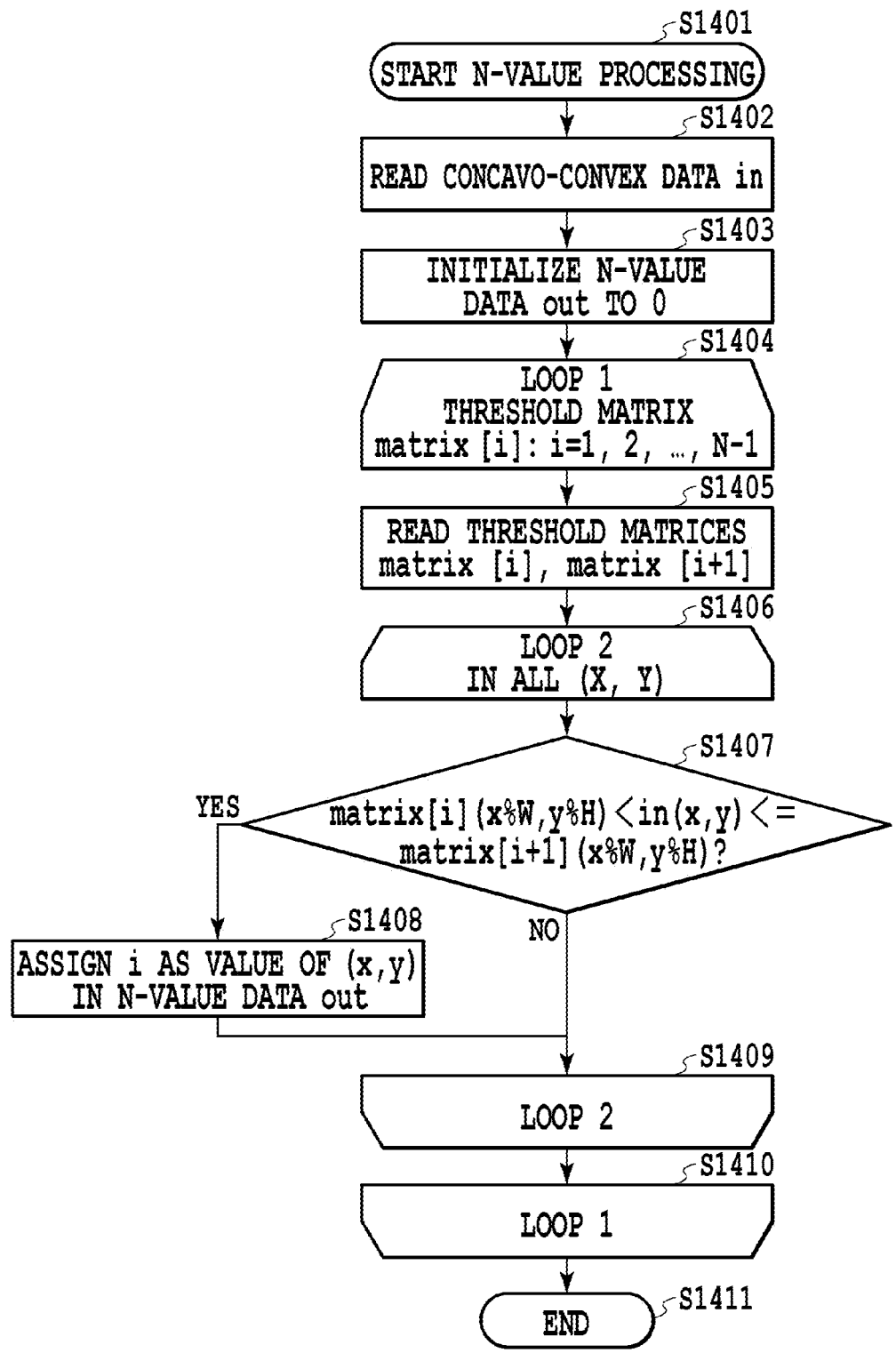
FIG. 14 is a flowchart showing a detailed example of N-value processing in Embodiment 4.

Next, in step S1302, the control unit 120 performs processing of converting the inputted concavo-convex data into the number of times of ink ejection for each pixel. FIG. 14 is a flowchart showing details of processing in step S1302. First, in step S1402, the control unit 120 reads the concavo-convex data received in step S1301 as in. Next, in step S1403, the control unit 120 initializes the values of all pixels in N-value data out (since the number of times of ink ejection is 0, 1, . . . , or 16, N=17) indicating the number of times of ink ejection for each pixel. Next, in steps S1404 to S1410, the concavo-convex data in is quantized to the N-value data out through threshold processing. FIGS. 15A to 15D show an example of a threshold matrix group used in the threshold processing. In a case of performing conversion to 17-value data, 16 threshold matrices are required. In step S1405, the control unit 120 reads the threshold matrices, allocates these matrices in a tile-like pattern, and, in step S1407, performs comparison of magnitude correlation between each of the threshold values and a corresponding target pixel in the concavo-convex data in. In FIG. 14, W expresses the number of columns in the matrix and H expresses the number of rows in the matrix. Specifically, in step S1407, the control unit 120 determines whether the value of the target pixel in the concavo-convex data in is greater than the threshold value of a coordinate position periodically corresponding to the target pixel in a matrix [i] and is equal to or less than the threshold value of a coordinate position periodically corresponding to the target pixel in a matrix [i+1]. In a case where the value of the target pixel in the concavo-convex data in is greater than the threshold value of the coordinate position periodically corresponding to the target pixel in the matrix [i] and is equal to or less than the threshold value of the coordinate position periodically corresponding to the target pixel in a matrix [i+1], the processing proceeds to step S1408. Then, i is assigned as the value of a pixel in the N-value data out which is at the same coordinates as the target pixel. For example, the value of each pixel in the N-value data out is determined in the following way: in a case where the value of the target pixel is greater than the corresponding threshold value in the matrix [1] and is equal to or less than the corresponding threshold value in the matrix [2], the number of times of ink ejection for this target pixel is set to one. This processing is processing called multi-value dither processing. Moreover, the method of conversion to N-value data may be a multi-value error diffusion method which is a method generally known as error diffusion method expanded for multi-value. In the error diffusion method, quantization is performed based on quantized error occurring in pixels near the target pixel. As described above, the concavo-convex data is quantized in such a way that the average value of the height of the concavo-convex data and the average value of the height indicated by the N-value data are substantially equal in any local region including the target pixel.

Figure 16:
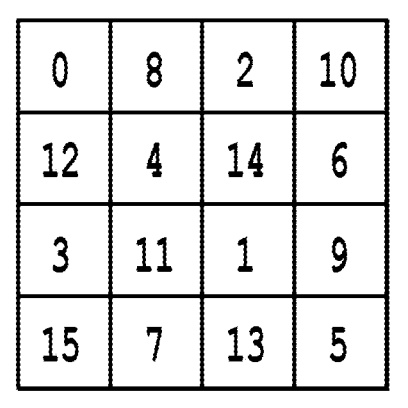

The threshold matrices used in the aforementioned multi-value dither processing can be generated in the following method for example. FIG. 16 shows a threshold matrix which is a base of the threshold matrices in FIGS. 15A to 15D. In this case, a matrix called Bayer dither matrix is generally used. Multiple threshold matrices for the multi-value dither processing are calculated by using a formula of matrix [i] (x, y)=(i−1)×16+Bayer(x, y), where the threshold value of each of pixels in the Bayer dither matrix is Bayer(x, y). In this formula, i expresses the number of the threshold matrix. However, the aforementioned matrix generation method is merely an example, and matrices generated in any publicly-known technique can be used.

FIGS. 17A to 17D are views showing examples of concavo-convex data and N-value data generated by performing the aforementioned N-value processing of step S1302 on the concavo-convex data. FIG. 17A shows concavo-convex data inputted in a case where a layer with a thickness of 20 μm is to be formed, and FIG. 17B shows the result of N-value conversion on the concavo-convex data of FIG. 17A. In this case, since a layer formed at the ink amount of 100% has a thickness of 20 μm, the number of times of ink ejection is one for all pixels as shown in FIG. 17B. Meanwhile, FIG. 17C shows concavo-convex data inputted in a case where a layer with a thickness of 30 μm is to be formed. FIG. 17D shows the result of N-value conversion on the concavo-convex data of FIG. 17C. Since the thickness of 30 μm is a thickness between the thickness of one layer and the thickness of two layers, pixels in which the number of times of ejection is one and pixels in which the number of times of ejection is two exist at a ratio of 50:50 as shown in FIG. 17D.

Figure 18:
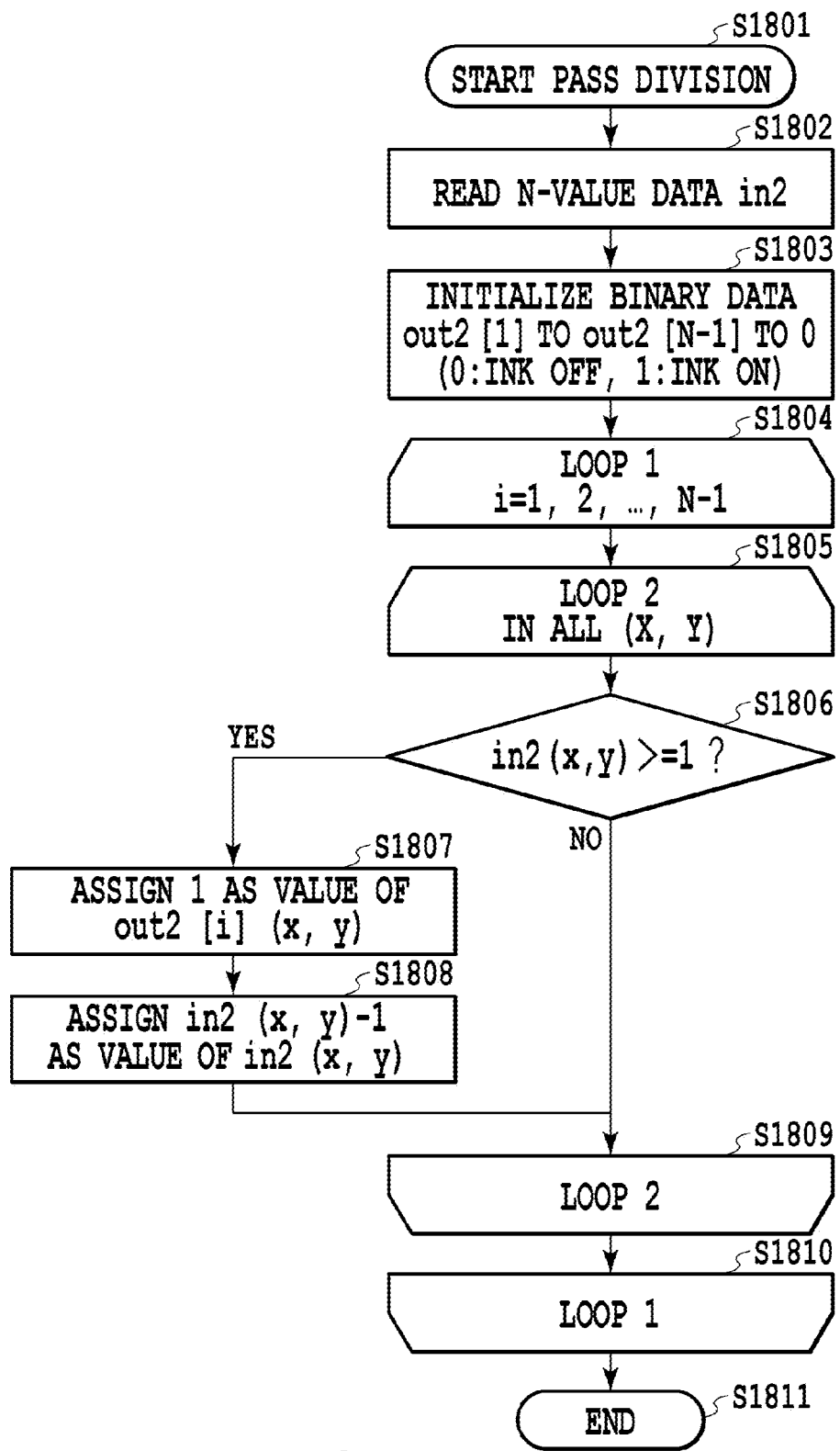
FIG. 18 is a flowchart showing a detailed example of pass division processing in Embodiment 4.

Next, in step S1303, the control unit 120 divides the N-value data obtained in step S1302 to generate binary division data indicating on and off of the ink for each pixel in each pass in multi-pass printing (pass separation processing). FIG. 18 is a flowchart showing details of step S1303. First in step S1802, the control unit 120 reads the N-value data generated in step S1302 as in2. Next, in step S1803, the control unit 120 initializes all of pixels in binary data out2 [1] to binary data out2 [N−1]. Binary data out2 [i] is data indicating on-off control of the ink in the i-th pass. Specifically, in a pixel in which the binary data out2 [i] is 1, the ink is ejected in the i-th pass. Meanwhile, in a pixel in which the binary data out2 [i] is 0, no ink is ejected in the i-th pass. Then, in steps S1804 to S1810, the control unit 120 allocates the N-value data in2 to a pattern indicating on and off of the ink for each pixel in each pass. Here, i in step S1804 indicates the number of pass, and the numbers are assigned sequentially to a first pass, a second pass, and so on from a smaller number. Specifically, a pattern of i=1 is formed in the lowermost layer of the concavo-convex and a pattern of i=N−1 is formed on the uppermost layer. In step S1806, the control unit 120 determines whether the value of the target pixel in the N-value data in2 is 1 or more. In a case where the value is 1 or more, the control unit 120 assigns 1 as the value of a pixel corresponding to the target pixel in the binary data out2 [i] in step S1807. Then, in step S1808, the control unit 120 sets a value obtained by subtracting 1 from the value of the target pixel in the N-value data in2 as the value of the target value. In other words, the control unit 120 decrements the value of the target pixel. This processing is repeated with all of the pixels sequentially set as the target pixel. After the processing is performed with all of the pixels set as the target pixels, i is updated and the same processing is repeated again. As described above, in steps S1806 to S1808, the processing of sequentially allocating values to the binary data out2 is repeated in a case where data of 1 or greater exists in the inputted N-value data in2. FIGS. 19A to 19C show binary division data generated from the N-value data of FIG. 17D. In this example, 1 indicates on of the ink and 0 indicates off of the ink. FIG. 19A is a pattern of i=1 (first pass), FIG. 19B is a pattern of i=2 (second pass), and FIG. 19C is a pattern of i=3 and the following passes. In this example, a layer corresponding one layer is formed in the first pass and a layer corresponding to 0.5 layers is formed in the second pass, and the total thickness is 30 μm.

Lastly, in step S1304, the concavo-convex forming apparatus forms concavo-convex based on the determined binary division data. Moreover, the concavo-convex forming apparatus prints an image on the formed concavo-convex as needed.

As described above, controlling the height through the area coverage modulation enables formation of concavo-convex with a height which cannot be formed only by stacking uniform layers of the ink amount of 100%.

Embodiment 5

In Embodiment 4, description is given of the example in which a layer having a thickness less than one layer can be formed by controlling the height through the area coverage modulation. In the case of forming a layer having a thickness less than one layer, fine concavo-convex is sometimes formed. For example, even in a case where a flat surface shape is desired to be formed by performing the area coverage modulation as in FIG. 19B, the ink is not ejected in all of the pixels but is sparsely ejected. Accordingly, fine concavo-convex is sometimes formed. The concavo-convex is more visible particularly in a case where the number of times of ink ejection is small and the ink is ejected more sparsely. In the embodiment, description is given of a method of reducing fine concavo-convex and forming a smooth layer. There are several methods of reducing fine concavo-convex. Description is given below of portions of processing which are changed from those of Embodiment 1 and Embodiment 4.

First change is made in the N-value processing described in step 1302 of Embodiment 4. In the embodiment, a matrix called dispersion matrix is used as the matrix used in the multi-value dither processing. By using the dispersion matrix, pixels in which the ink is ejected are dispersed evenly and difference in the degree of sparseness of the ink is less likely to occur in a local region. A blue noise mask method and the like are known as a method of generating the dispersion matrix. Moreover, this objective can be achieved also by using multi-level error dispersion processing for the N-value conversion. Meanwhile, in Embodiment 1, it is only necessary to change the binarization processing of step S606 to processing in which binarization is performed by a dither method or an error dispersion method which similarly uses the dispersion matrix.

The second change is changing of the stacking order of layers. In step S1804 of Embodiment 4, the order of i indicating the stacking order of layers in loop 1 is changed to the descending order. In a layer of FIG. 19B, pixels in which the ink is ejected and pixels in which no ink is ejected mixedly exist and fine concavo-convex is likely to be formed. If this layer is formed as a surface layer, the fine concavo-convex is likely to be perceived. To solve this problem, the fine concavo-convex is reduced in the following way. The formation order of the layers is determined such that the layer of FIG. 19B is not formed as the outermost surface, and a relatively-smooth layer in which the ink is ejected in all of pixels is formed on a layer having fine concavo-convex to cover this layer. In the processing of Embodiment 1, in step S605, the slice data stacking order is determined such that the slice data corresponding to the ink amount of 100% is set as the slice data for the outermost surface.

The third change is controlling the ratio of division of ink ejection in the pass division step of step S1303 in Embodiment 4. Specifically, in a case where a shape having a height corresponding to, for example, an ink amount of 125% is desired to be formed, the total ink amount of 125% is not divided into 100% and 25% which are ink amounts to be ejected in the respective passes. Instead, the pass division is performed such that there is no pass in which the ink amount is small (in this example, 25%) and the total ink amount of 125% is divided into, for example, 50% and 75%. Such division is performed because fine concavo-convex is more visible in a case where the number of times of ink ejection is small. On the other hand, in a case where the number of times of ink ejection is great, ink droplets are connected to each other to cover the entire surface and form a smooth surface. Examples of pass division in a case where the division is performed in the ratios described above are shown in FIGS. 20A to 20E. FIG. 20A shows N-value data which is original data to be divided (indicates an ink amount of 125%). Pieces of binary division data obtained in a case where the ink amount is divided into 100% and 25% as a division example 1 are shown in FIGS. 20A and 20C. Pieces of binary data obtained in a case where the ink amount is divided into 50% and 75% as a division example 2 are shown in FIGS. 20D and 20E. In the division example 2, there is no pattern in which the number of times of ink ejection is small as in FIG. 20C. In the processing of Embodiment 1, it is only necessary to distribute the concavo-convex data in the slice processing step of step S602 such that each layer has a height corresponding to an ink amount of a certain percentage. In this case, in a case where the patterns of pieces of binary division data for respective passes are similar to each other, the degree of fine concavo-convex increases depending on the way the patterns are overlapped. Accordingly, it is desirable to change the matrices of dither processing for the respective layers to ones different from each other.

An example of a method of the division is given. For example, in a case where a height corresponding to, for example, an ink amount of 210% is desired to be formed, 210 is divided by three to be substantially-evenly divided into 70, 70, and 70. This is calculated by dividing the target ink amount by the minimum number of passes required to obtain the height corresponding to the target ink amount (for example, in a case where the ink amount is 250, the ink amount is divided by three; in a case where the ink amount is 360, the ink amount is divided by four). In other words, the calculation is performed by dividing X by a number obtained from int (X÷100)+1, where X is the percentage of the ink amount (decimal part of int is dropped). Such calculation enables division to be performed in such a way that a pass in which the number of times of ink ejection is small is less likely to occur. Note that expression "substantially-evenly" is used in the meaning of allowing a certain width of variation among the ink amounts obtained by division. For example, in the aforementioned case where the height corresponding to the ink amount of 210% is to be formed, the ink amount can be divided into 70%, 70%, and 70%, as a matter of course, and can be also divided into, for example, 60%, 70%, and 80%. Specifically, as long as the ink amounts obtained by the division are within a range obtainable by: converting a piece of binary division data which is originally 100% into data which is not 100%; and adding the ink amount subtracted from this data to another piece of binary division data which is originally not 100%, the division is within the scope of "substantially-evenly." The idea described above can be applied to a method including a step of generating slice data as in Embodiment 1. In this case, in step S602, the obtained concavo-convex data is not divided at the contour lines provided at intervals corresponding to the ink amount of 100%. Instead, as in the idea described above, for example, the ink amount of 210% is divided into 70%, 70%, and 70% or 60%, 70%, and 80%.

As described above, it is possible to reduce fine concavo-convex and form a smooth layer in a case where a layer having a thickness less than one layer is formed by area coverage modulation.

Other Embodiments

In the embodiments described above, description is given of the examples in which the data indicating on and off of the ink is generated from the concavo-convex data indicating the height of the concavo-convex in each pixel. However, the following mode can be employed. A data generation apparatus such as an external computer generates the data indicating on and off of the ink from the concavo-convex data and transmits the generated data to the concavo-convex forming apparatus. Such a data generation apparatus may function also as the control unit of the concavo-convex forming apparatus, as a matter of course.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the present invention, it is possible to form an uneven shape having excellent characteristics by taking in consideration of reproduction characteristics of sharpness and smoothness in concavo-convex formation processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-137905, filed Jul. 3, 2014, which is hereby incorporated by reference wherein in its entirety.

What is claimed is:

1. A control apparatus configured to control a forming apparatus which forms a concavo-convex structure by stacking materials, comprising:

an obtaining unit configured to obtain concavo-convex data indicating the concavo-convex structure to be formed;

a dividing unit configured to divide the concavo-convex data into a plurality of pieces of data for a plurality of scanning; and a control unit configured to control the forming apparatus based on the plurality of pieces of data, wherein wherein the control unit controls a formation order, performed by the forming apparatus, of concavo-convex portions each corresponding to the plurality of pieces of data divided by the dividing unit based on a feature amount of the concavo-convex structure indicated by the concavo-convex data.

2. The control apparatus according to claim 1, wherein the control unit uses a degree of sharpness of the concavo-convex data as the feature amount.

3. The control apparatus according to claim 1, wherein the dividing unit generates pieces of slice data corresponding respectively to a plurality of layers by dividing the concavo-convex data indicating the concavo-convex structure to be formed, and the control unit controls the forming apparatus in such a way that: a piece of the slice data for an uppermost layer in a region of a sharp portion of the concavo-convex structure is recorded in a last scanning operation for the region; and other pieces of the slice data in the region of the sharp portion are recorded in a reverse scanning order such that apiece of the slice data for a lower layer is recorded in a scanning operation in an earlier stage.

4. The control apparatus according to claim 3, wherein the control unit controls the forming apparatus in such a way that the forming apparatus sequentially records the pieces of slice data in a region other than the region of the sharp portion of the concavo-convex structure, from a piece of the slice data for a lower layer.

5. The control apparatus according to claim 1, wherein the forming apparatus forms the concavo-convex structure by ejecting curable ink.

6. The control apparatus according to claim 1, wherein the obtaining unit obtains data indicating a height of the concavo-convex structure to be formed in each of pixels as the concavo-convex data.

7. The control apparatus according to claim 1, wherein, in the control unit, an operation condition for the forming apparatus in a region having a predetermined feature amount is different from that in a region having a feature amount other than the predetermined feature amount.

8. The control apparatus according to claim 1, wherein the control unit uses a frequency component of the concavo-convex data as the feature amount.

9. The control apparatus according to claim 1, wherein the control unit uses a degree of importance of height accuracy or inclination angle accuracy as the feature amount.

10. The control apparatus according to claim 1, wherein the control unit uses a feature amount of an image to be formed on the concavo-convex structure formed by the forming apparatus as the feature amount.

11. The control apparatus according to claim 1, wherein the concavo-convex data is data indicating a height of the concavo-convex structure to be formed in each of pixels, the control apparatus further comprises a quantization unit configured to quantize the concavo-convex data to N-value (N is an integer of two or greater) data, the quantization unit quantizes the concavo-convex data in such a way that an average value of a height in the concavo-convex data and an average value of a height indicated by the N-value data are substantially equal in any local region including a target pixel, and the control unit controls the forming apparatus based on the N-value data obtained from the quantization unit.

12. The control apparatus according to claim 11, further comprising a binary division unit configured to divide the quantized N-value data into a plurality of pieces of binary division data.

13. The control apparatus according to claim 12, wherein the binary division unit divides the quantized N-value data into the plurality of pieces of binary division data in such a way that values of pixels corresponding to a scanning operation in a later stage are uniform.

14. The control apparatus according to claim 12, wherein, in a case where the average value indicated by the N-value data in any local region is not an integer, the binary division unit divides the N-value data into the plurality of pieces of binary division data in such a way that an ink amount in any local region is substantially-equally divided between the plurality of pieces of binary division data.

15. A control method for controlling a forming apparatus which forms a concavo-convex structure by stacking materials, comprising:

obtaining concavo-convex data indicating the concavo-convex structure to be formed;

dividing the concavo-convex data into a plurality of pieces of data for a plurality of scanning; and controlling a formation order, performed by the forming apparatus, of concavo-convex portions each corresponding to the plurality of pieces of data based on a feature amount of the concavo-convex structure indicated by the concavo-convex data.

16. Anon-transitory computer readable storage medium storing a program which performs a control method for controlling a forming apparatus which forms a concavo-convex structure by stacking materials, the control method comprising:

obtaining concavo-convex data indicating the concavo-convex structure to be formed;

dividing the concavo-convex data into a plurality of pieces of data for a plurality of scanning; and controlling a formation order, performed by the forming apparatus, of concavo-convex portions each corresponding to the plurality of pieces of data based on a feature amount of the concavo-convex structure indicated by the concavo-convex data.

* * * * *